Dec. 6, 1966      L. L. LOWE      3,289,684

AUTOMOBILE SLEEPING UNIT

Filed Nov. 20, 1964      3 Sheets-Sheet 1

INVENTOR.
Lyall L. Lowe
BY
Sam J. Slotsky
ATTORNEY

Dec. 6, 1966   L. L. LOWE   3,289,684
AUTOMOBILE SLEEPING UNIT
Filed Nov. 20, 1964   3 Sheets-Sheet 2

INVENTOR.
Lyall L. Lowe
BY
Sam J. Slotoby
ATTORNEY

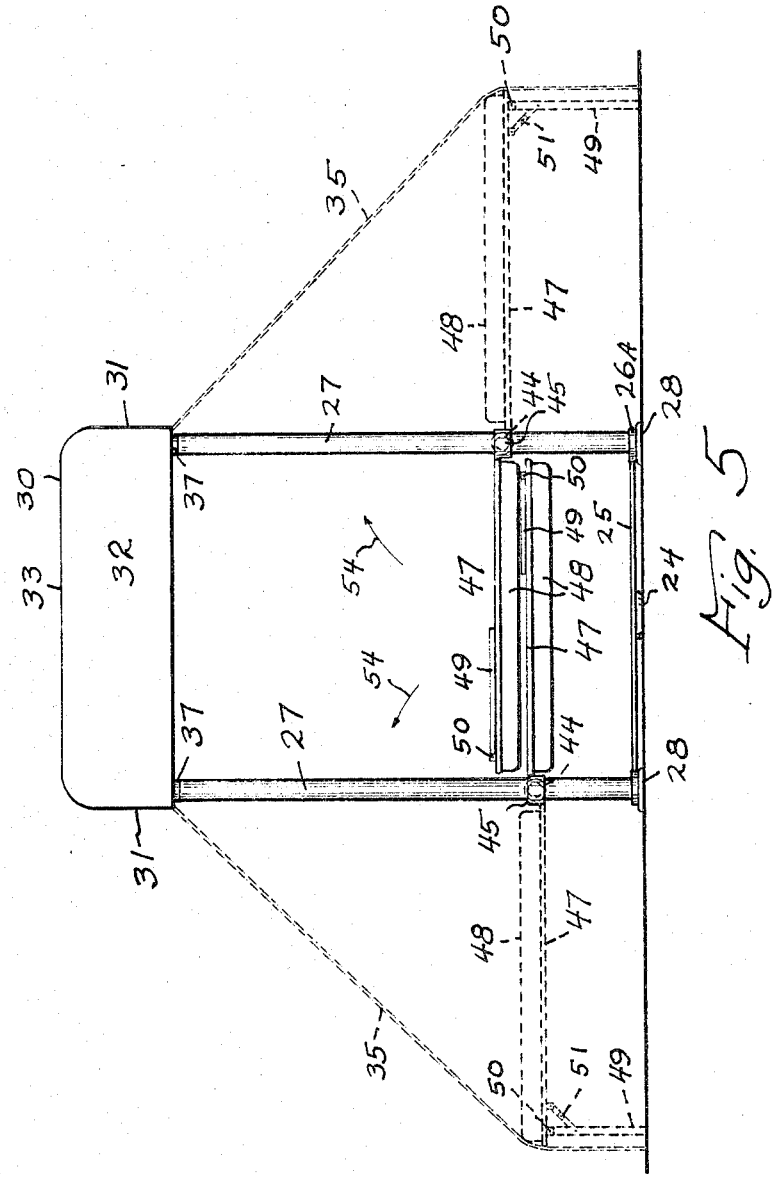

United States Patent Office 3,289,684
Patented Dec. 6, 1966

3,289,684
AUTOMOBILE SLEEPING UNIT
Lyall L. Lowe, 2405 E. 4th St., Sioux City, Iowa
Filed Nov. 20, 1964, Ser. No. 412,737
1 Claim. (Cl. 135—1)

My invention relates to an automobile sleeping unit.

An object of my invention is to provide an automobile sleeping unit which can be conveniently carried on the top of the automobile and transported thereby to any desired location, the unit then being convertible into a complete enclosing unit having sleeping bunks therein, and a substantially large inner living space etc.

A further object of my invention is to provide such a unit in a compact structure, and to further provide an arrangement whereby the automobile which carries the unit can be easily driven out of the unit when being used as a housing unit.

A further object of my invention is to provide a sleeping bed arrangement which is substantially solid in construction.

Figure 1:
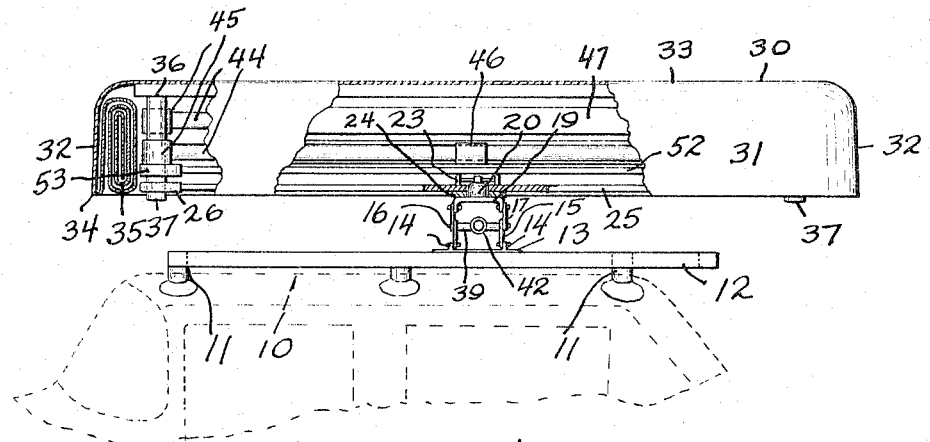
Figure 2:
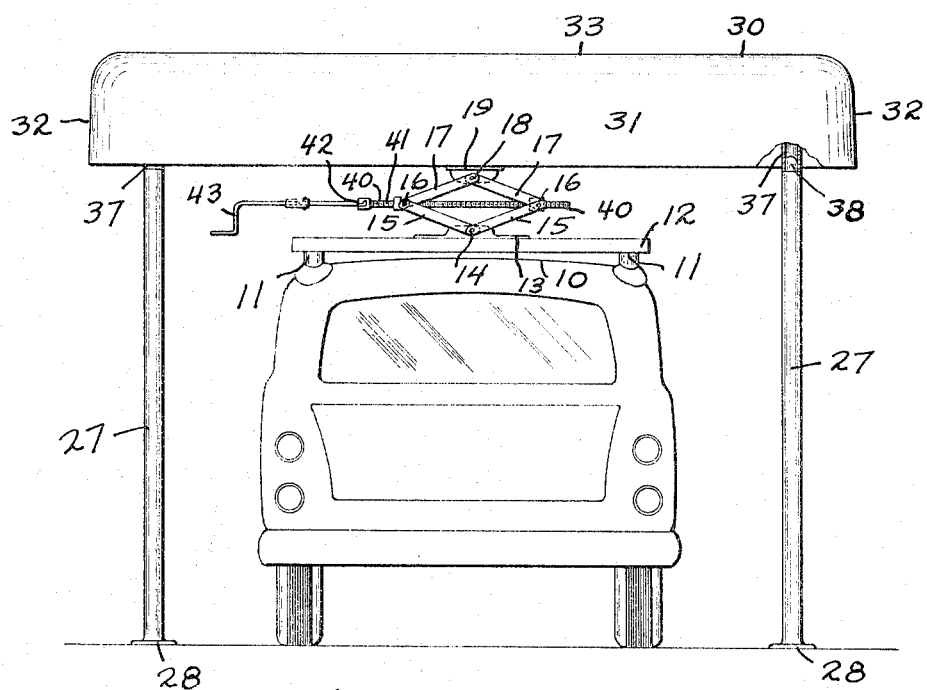
Figure 3:
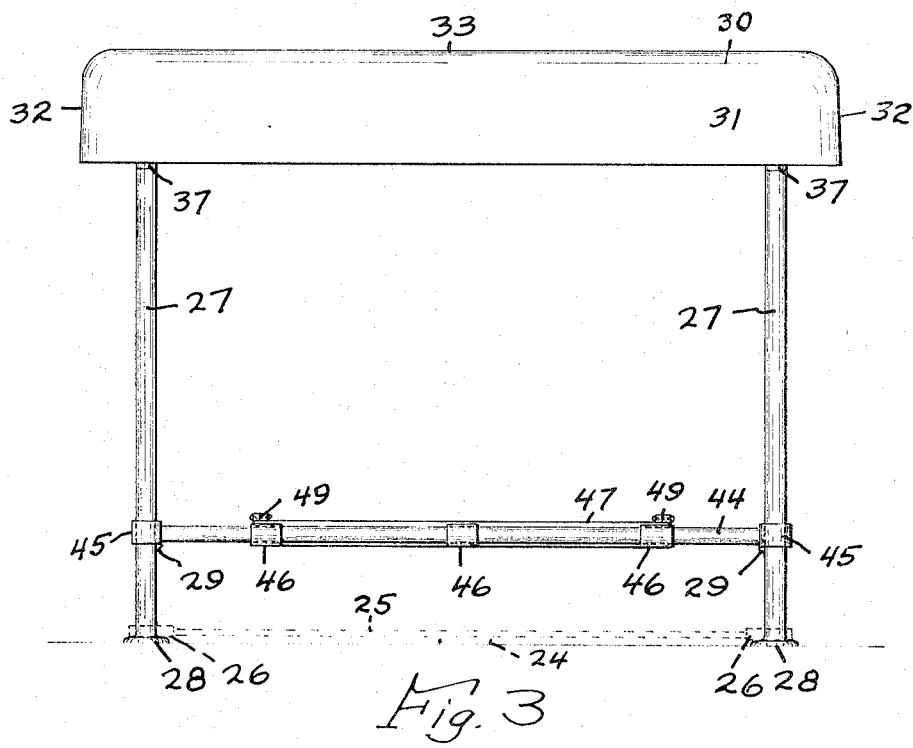
Figure 4:
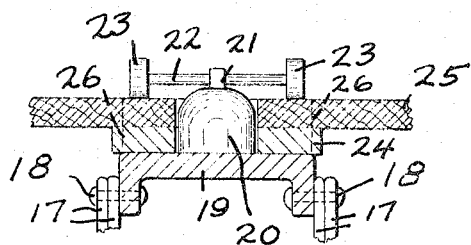

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a side sectional view of the unit in its collapsed form and when being carried by the automobile, FIGURE 2 is a view of the unit just before the automobile is to be driven out from under the collapsed unit, FIGURE 3 is a further side elevation, FIGURE 4 is an enlarged detail, and FIGURE 5 is an end view showing the bed units in folded and opened positions.

The present application includes improvements on my co-pending application on an Automobile Sleeping Unit, Serial No. 326,069, filed November 26, 1963.

In describing my invention I have used the character 10 to designate the top of an automobile to which is attached at 11 the framework 12 which is adapted to support the housing unit, and I have further used the character 13 to indicate a plate attached to the member 12 and pivoted at 14 to the plate 13 are the links 15 which are pivoted at 16 to the further links 17 which links 17 are pivoted at 18 to a plate 19.

Attached to the plate 19 is a raised boss 20 to which is attached at 21 a rod 22 and journalled on the rod 22 are the rollers 23.

The character 24 indicates a plate suitably attached to a floor member 25, the members 25 and 24 including the slots 26 therein which slots are wide enough to allow the rollers 23 to pass therethrough when required. The floor member 25 is attached to the various rings 26A which rings are adapted to receive the tubes 27 having the expanded ends 28, the tubes 27 including the small raised portions 29 which raised portions can pass through the rings 26A when required.

The character 30 indicates an upper housing member having the various walls 31, 32 and top wall 33, and attached to the lower edges of the walls 31 and 32 at 34 are the collapsible or rolled up fabric tent portions 35, and attached as at 36 to the top wall 33 are the tubes 37 which are adapted to receive the reduced ends 38 of the various tubes 27 as will be explained.

Attached across the pivoting points 16 are the bars 39 (See FIGURE 1) which bars threadably receive the oppositely threaded portions 40 of the rod 41 which includes a socket at 42 for engaging the turning handle 43, whereby rotation of the handle 43 will correspondingly cause the links 15 and 17 to spread apart or draw together when necessary.

The character 44 indicates tubes attached to the rings or collars 45 which collars freely receive the tubes 27, and receiving the tubes 44 are the further collars 46, and attached to the collars 46 are the bed units 47 having the pads 48 attached thereto, and attached to the members 47 are the collapsible legs 49 pivoted at 50 and including the bracing portions at 51 to brace the beds when in the position shown in FIGURE 5.

If desired a further member 52 having the rings 53 can be used with the unit, the member 52 being somewhat similar to the unit shown in my co-pending application, and which unit includes a suitable shelf portion and the like.

The arrangement is operated in the following manner.

As shown in FIGURE 1 the unit will be carried at the top of the vehicle when traveling, and if desired, suitable bracing straps can be also used to additionally secure the upper member 30, and the tubes or pipes 27 can be carried separately or with the unit.

When it is desired to use the unit as a housing unit, first the entire unit 30 containing the collapsed parts is rotated while maintained on the top of the automobile to the position shown in FIGURE 2 and during such rotation the rollers 23 will roll on the member 25, until they occupy the position shown in FIGURE 4, and as viewed in FIGURE 2 there will then be ample room between the automobile and the supports 27, the supports 27 being placed so that their upper ends 38 will be received within the tubes 37, the screw or threaded rod 41 permitting raising or lowering of the plate member 19 as desired for adjustment, and after the unit is in the position shown in FIGURE 2 the handle 43 is again rotated which will bring the member 19 downwardly and whereby the rollers 23 will pass through the slots 26, and whereby the automobile can then be driven out of the unit.

The tubes or pipes 27 are the same diameter as the tubes 37, and the lower rings 26 attached to the member 25 can include securing means for securing the rings 26 to the tubes 37 until it is desired to lower all of the units, the securing means then being loosened, whereby all of the various rings and collars 26, 53 and 45 will pass downwardly along the tubes or pipes 27 until the floor unit occupies the lowermost position as shown in FIGURE 3 and wherein the collars 45 will then rest upon the portions 29 to secure the same.

The bed units 47 can then be swung in the direction of the arrows 54 as shown in FIGURE 5 until the beds occupy the dotted position shown whereupon the legs are then opened to the dotted position shown and whereby the beds are then ready for use.

The fabric tent portions 35 which are on all sides of the arrangement, and which are suitably cut in shape so as to be wider at their lower portions are then brought downwardly and placed as shown by the dotted lines in FIGURE 5 whereby they will suitably cover the occupants of the beds and whereby the inner space of the unit can be conveniently used for other purposes, the member 52 being also used if desired.

After use the units can then be brought upwardly into the casing etc., first swinging the beds back to the position shown by the solid lines in FIGURE 5, and the handle 43 can then be again operated to force the rollers 23 through the slots 26, the casing is then rotated back to its original position and the unit is then ready for travel.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

An automobile sleeping unit comprising an upper casing adapted to be carried on the top of said automobile, said casing including fabric tent members secured along the marginal portions of said casing, a plurality of vertically positioned tubes attached to said casing, further vertically positioned support members adapted to engage said tubes, bed members engaging said tubes and said support members, said bed members being lowered along said support members, longitudinally positioned support bars adjustably attached between said support members, means for pivoting said bed members about said longitudinally positioned support bars to provide exteriorly positioned beds, and whereby said fabric tent members can be draped over said bed members to enclose the same, a floor member adjustably secured to said tubes and to said support members, a jack attached to the top of said automobile for raising or lowering said floor member and said casing when said floor member is within said casing, means for providing rotation of said casing to a position substantially at right angles to the longitudinal axis of said automobile for providing a larger space when said automobile is moved from beneath said casing, said floor member having an opening, an upper plate attached to said jack, a boss attached to said plate, a horizontally positioned rod attached to said boss, rollers journalled on said rod adapted to bear against said floor member when said rod is rotated, said floor member having slots adapted to allow passage of said rollers through said slots when said jack is lowered.

References Cited by the Examiner

UNITED STATES PATENTS

| | | | |
|---|---|---|---|
| 1,425,965 | 8/1922 | Hocke | 214—515 |
| 2,402,579 | 6/1946 | Ross | 182—63 X |
| 2,640,999 | 6/1953 | Sheppard. | |
| 3,010,462 | 11/1961 | Barber | 135—1 |

FOREIGN PATENTS 1,270,934    7/1961    France.

HARRISON R. MOSELEY, *Primary Examiner.*

L. J. SANTISI, A. I. BREIER, *Assistant Examiners.*